US007620667B2

(12) United States Patent
Rollin et al.

(10) Patent No.: US 7,620,667 B2
(45) Date of Patent: Nov. 17, 2009

(54) TRANSFER OF USER PROFILES USING PORTABLE STORAGE DEVICES

(75) Inventors: Kelly E. Rollin, Seattle, WA (US); Stephane St-Michel, Woodinville, WA (US); Christopher John Guzak, Kirkland, WA (US); Giles van der Bogert, Kirkland, WA (US); Brian D. Wentz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 10/713,429

(22) Filed: Nov. 17, 2003

(65) Prior Publication Data

US 2005/0108297 A1    May 19, 2005

(51) Int. Cl.
*G06F 17/30* (2006.01)
(52) U.S. Cl. ..................................................... 707/204
(58) Field of Classification Search .................... 707/1, 707/2, 9, 10, 200, 3, 201, 204; 713/201; 345/745, 810; 715/707; 709/226
See application file for complete search history.

(56) References Cited

U.S. PATENT DOCUMENTS

| 6,000,000 | A | 12/1999 | Hawkins et al. |
| 6,205,448 | B1 | 3/2001 | Kruglikov et al. |
| 6,262,730 | B1 * | 7/2001 | Horvitz et al. ............... 715/707 |
| 6,330,618 | B1 | 12/2001 | Hawkins et al. |
| 6,440,068 | B1 | 8/2002 | Brown et al. |
| 6,505,215 | B1 * | 1/2003 | Kruglikov et al. ............ 707/201 |
| 6,553,037 | B1 | 4/2003 | Pivowar et al. |
| 6,611,849 | B1 | 8/2003 | Raff et al. |
| 6,622,115 | B1 | 9/2003 | Brown et al. |
| 7,089,593 | B1 * | 8/2006 | Dono et al. ..................... 726/26 |
| 2002/0090934 | A1 * | 7/2002 | Mitchelmore ............... 455/412 |
| 2002/0135613 | A1 * | 9/2002 | O'Hara ........................ 345/745 |
| 2002/0180803 | A1 * | 12/2002 | Kaplan et al. ................ 345/810 |
| 2003/0028451 | A1 * | 2/2003 | Ananian ........................ 705/27 |
| 2003/0046567 | A1 * | 3/2003 | Carman ........................ 713/193 |
| 2003/0154282 | A1 * | 8/2003 | Horvitz ......................... 709/226 |
| 2003/0161193 | A1 | 8/2003 | Moran et al. |
| 2004/0073567 | A1 * | 4/2004 | Pelon ........................... 707/102 |
| 2004/0215278 | A1 * | 10/2004 | Stegink et al. ................. 607/30 |
| 2004/0268148 | A1 * | 12/2004 | Karjala et al. ................ 713/201 |

OTHER PUBLICATIONS

"Welcome to KeyComputing-An M-Systems Company"; located at http://www.key-computing.com.
Jing et al., Client Server Computing in Mobile Environments, ACM Computer Surveys, vol. 31, No. 2, Jun. 1999, 41 pages.

* cited by examiner

*Primary Examiner*—Etienne P LeRoux
(74) *Attorney, Agent, or Firm*—Shook, Hardy & Bacon LLP

(57) ABSTRACT

A method and apparatus for transferring user profiles between computing devices using portable storage devices is disclosed. A portable storage device (PSD) is connected to a computing device, the computing device reads user profile data from the PSD and configures itself according to that data. If the user profile data is changed on the computing device, those changes are synchronized on the PSD.

35 Claims, 10 Drawing Sheets

Figure 8

| Content | Text Description | Behavior | Size |
|---|---|---|---|
| Settings | "Sync all settings" (default selection) | All settings on the system will be synchronized (default behavior) | "<size> MB" |
| | "Choose which settings to sync" | This will result in a drill down page (not listmaker/basket though) that lists out all the State registered manifests. The user will be able to select which ones, via checkbox, will sync. | |
| | "Don't sync settings" | No settings are synched | |

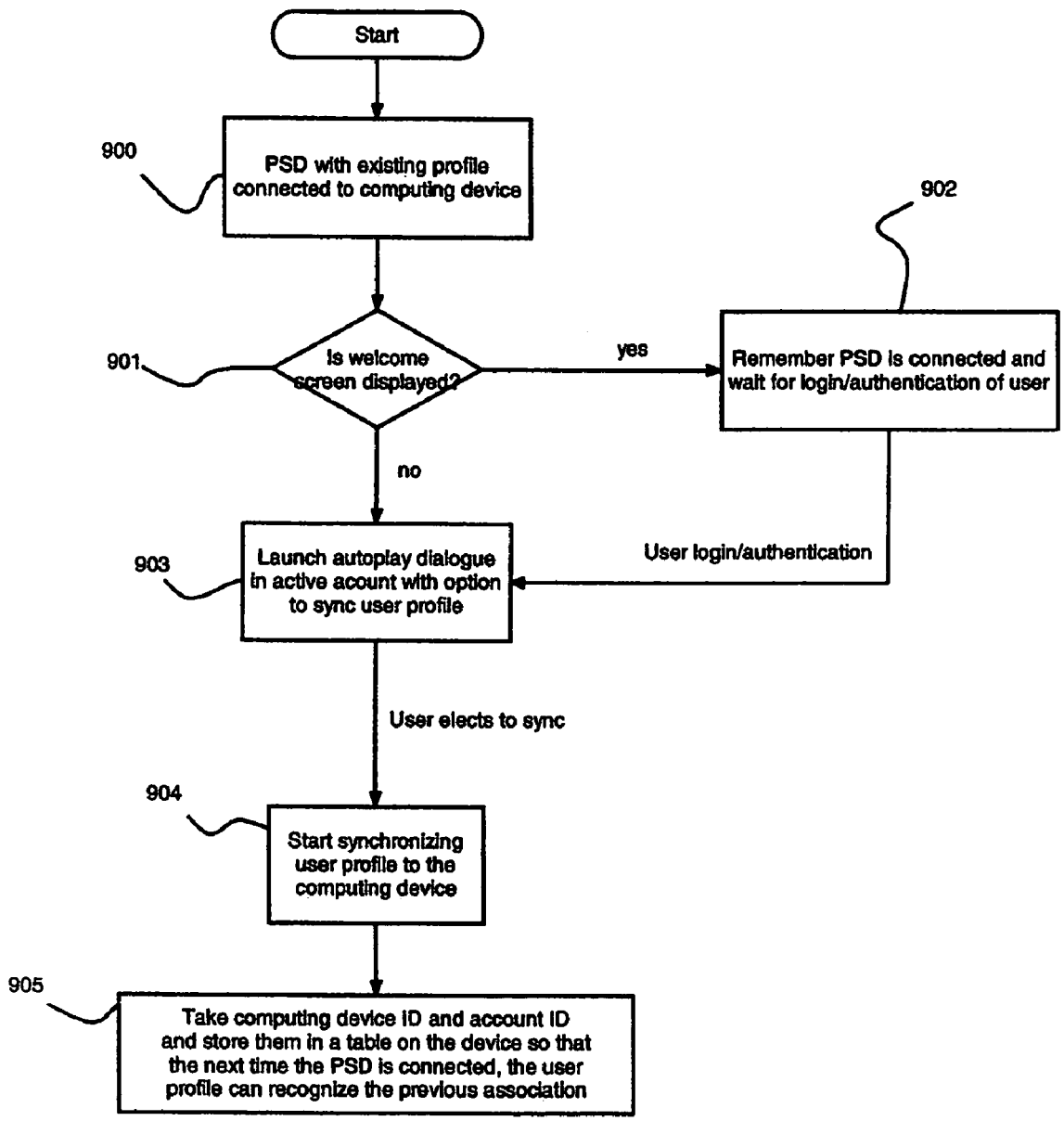

TRANSFER OF USER PROFILES USING PORTABLE STORAGE DEVICES

FIELD OF THE INVENTION

The invention relates generally to synchronization techniques in computer systems. More specifically, the invention provides systems and methods for synchronizing files and settings between various computer systems through the use of portable storage devices.

BACKGROUND OF THE INVENTION

In today's mobile society, computer users often find themselves forced to use a computer that does not belong to them. For example, a business person might travel to another city or country to meet with a client. Even if the business person has a laptop computer, he or she may not wish to go through the hassle of bringing it through airline security due to the time constraints associated with doing so. Also, because notebook computers are easily stolen, the business traveler may wish to not risk losing important data by bringing the notebook computer along. As a result, upon arriving at the destination, the business traveler may be forced to use a public computer or a computer owned and operated by the client. A problem associated with using someone else's computer system in this manner is that the computer system will not have the user's files and/or settings stored on it. Thus, the business traveler must find some way to access his files and/or settings from the other computer.

Many computer users own (or have regular access to) two computers—a desktop computer that serves as a primary computer and a mobile computer used for traveling. One of the difficulties associated with maintaining two different computers is keeping files current on both systems. For example, if the user updates a file on his primary desktop computer, and later wishes to update that file while traveling, he must first transfer a copy of the file from the desktop computer to the mobile computer in order to ensure that he is working with the most recent version of the file. Once the user has modified the file on the mobile computer, in order later to use the file on the primary desktop computer, he must transfer a copy of the file back to that computer. Failing to make this transfer may result in changes being lost. Current computer systems do not allow users to easily transport their files and settings between multiple computers.

Various file synchronization techniques have been proposed and implemented to alleviate these and other problems associated with keeping data current between multiple computer systems.

One technique that is used to help a user organize and keep files up-to-date between personal computers is called a briefcase. A briefcase is used to "carry" files away from a first computer and bring them on a "trip" to a second computer. In one implementation of a briefcase, a user creates a briefcase folder and drags (i.e. copies) files into it from the first computer. The files can come from either a local hard drive or a network share. The briefcase keeps track of the location from where the original file was copied. The briefcase can be used with a single mobile computer in a networked environment to keep files updated on the network, or in a multiple computer setup to keep files synchronized between different personal computers.

In the single mobile computer networked environment, a mobile computer is connected to a local area network. User files are stored on the network and generally accessed from the network. When a user wishes to travel with the mobile computer, he may drag the files into the briefcase in order to have access to them when disconnected from the local area network. The user then accesses the files from the briefcase in order to work on them and saves any changes made to the files into the briefcase. When the user returns and reconnects to the local area network, the user selects the "update" function in the briefcase, and any modified files in the briefcase that have not been updated on the network are copied to the network.

In the multi-computer environment, a briefcase is created on removable storage media (e.g. a floppy disk). The removable storage media (RSM) is connected to a first computer, where a user can create a briefcase on the RSM and drag files located on the first computer into the briefcase located on the RSM. The user can then later place the RSM into a second computer, where the files in the briefcase may be accessed and modified. Upon returning the RSM to the first computer, the user can call an "update" function to bring the modified files up-to-date on the first computer.

Briefcases suffer from certain deficiencies. First, briefcases must be created and populated by the user. There is no function that automatically creates a briefcase on an RSM when it is connected to a computer. Second, the synchronization process using the briefcase must be initiated by the user. As a result, the user must remember to update the files, or they will not be automatically kept in sync. Finally, a briefcase is not equipped to store user environment settings such as desktop wallpaper and start menu configuration.

A second technique that has been used to synchronize files is known as folder redirection. Folder redirection involves storing the contents of a pre-designated file folder (e.g. a "My Documents" folder) associated with a user account onto a network share. The pre-designated file folder is then accessible from any computer on the network provided that the user is logged into his account. In order to get a seamless offline experience, client side caching (CSC) can be enabled on the local computer. CSC involves the use of a local file cache on the user's computer that allows a user to continue to access content from the network folder even when the computer is not connected to the network. For example, if the "My Documents" folder is redirected to a network share and is cached locally using CSC, when the network goes down, the user can continue to use the files in "My Documents" because the local cache is kept up-to-date by a synchronization process built into the CSC.

Folder redirection with client side caching has certain disadvantages associated with it. First, a network must be present in order for folder redirection to be implemented. Second, folder redirection must be enabled by a network administrator. Thus, users with little or no technical experience will not be able to implement this solution on their own. Third, although files can be accessed from various computers connected to the network, user environment settings such as desktop wallpaper and start menu configuration do not travel between machines.

A third technique that has been utilized for file synchronization purposes is roaming user profiles. A roaming user profile (RUP) is a set of information about a user stored on a network location. This set of information generally includes user files (e.g., documents, spreadsheets, presentations, etc.), application settings, and start menu settings. When a user logs into a network workstation, the RUP is copied onto the local system so it is available from that particular computer.

One problem with using RUPs is that the user must be logged onto a local area network in order for the RUP to be copied to the user's computer. Thus, it is difficult to implement this solution over a wide area. Second, setting up RUPs requires a certain level of expertise that is usually held by only system administrators and other information technology (IT) professionals. Finally, because RUPs can become very large, the process of logging in and out of the network can result in slowdowns due to the large amounts of data being copied over the network.

Although the above-described techniques attempt to provide an effective way to synchronize a user's files and settings among multiple computers, it is desirable to provide an improved and/or alternative way for providing a user with a consistent experience across a number of different computing devices.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

A first aspect of the invention provides for a method of transferring files and settings between computers. A portable storage device (PSD) is connected to a computer and the information on the PSD is read by the computer. The information is then used to configure the computer. If the information is modified, it is stored back to the PSD without any user interaction.

A second aspect of the invention provides for a method of creating a user profile on a computing device. A PSD is connected to the computing device, and the PSD is scanned for an indication of an existing user profile. If no existing user profile is found on the PSD, a user profile configuration wizard is launched, which in some embodiments allows the user to select data that will be stored in the user profile.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 8 illustrates a chart that details the logic used to configure settings according to aspects of the present invention.

FIG. 9 illustrates a flow chart that describes steps taken when a portable storage device with an existing user profile is connected to a computing device according to aspects of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
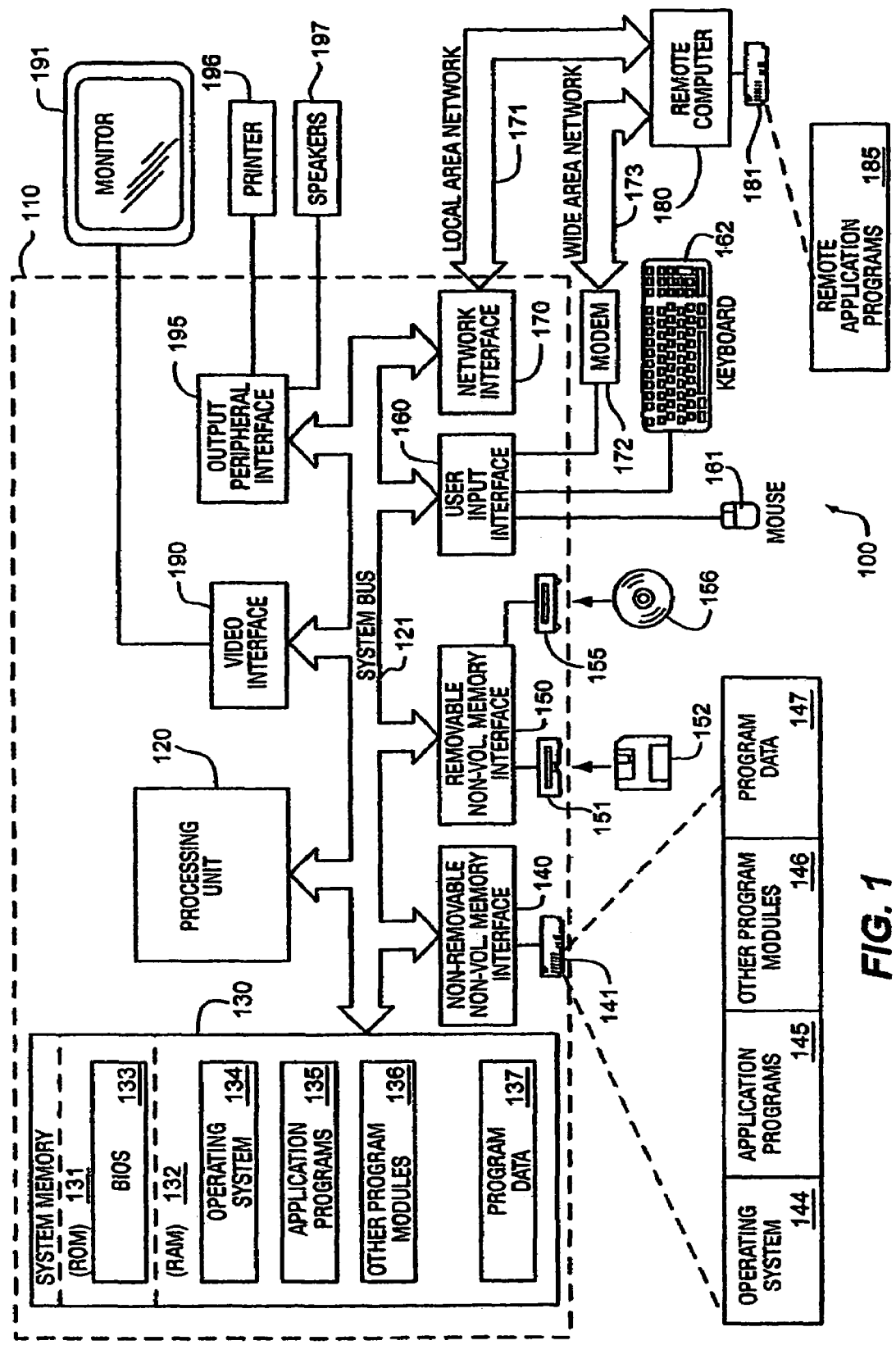
FIG. 1 illustrates an example of a suitable computing system environment on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In embodiments of the present invention, a portable storage device (PSD) may be used to transfer a user profile from one computing device such as the computer 110 shown in FIG. 1, to a second computing device, providing the user a consistent experience across various computing devices. To provide an illustrative example of how the present invention may be practiced, consider that a user may be working on his personal computer at his office. He has set up the computer such that the desktop background is a digital photograph of his family and he enjoys having that picture there to look at throughout the day. One day, while working on a document file that will not fit on a floppy disk, he is told that his office needs some repairs and he must temporarily vacate the office. He is given a notebook computer to work with in another office, but realizes that he cannot transfer his document file between the computers on a floppy disk because it is too big. Prior to vacating his office, the user connects a portable storage device such as a Memory Stick® to his office computer. According to aspects of the present invention, his files (e.g. the large document he is working on) and settings (e.g. the desktop digital photograph of his family) will automatically be transferred onto the Memory Stick®. When the user arrives at the other office, he logs into the notebook computer. He then connects the Memory Stick® to the notebook computer. According to further aspects of the invention, the system will ask the user if he wishes to use the profile stored on the Memory Stick®. If he says yes, the items in the profile will be automatically downloaded to the notebook computer causing the desktop background to be the same digital photograph of his family, and the large document to be downloaded into the corresponding folder on the notebook computer. The user opens the large document and continues working on it.

According to additional aspects of the invention, each time he saves changes to the document, these changes are automatically synchronized to the Memory Stick® by the system. While he is working on the notebook computer, the user receives an e-mail from his wife that has a new digital photograph of his family attached to it. The user decides to make this new photograph the desktop background, and replaces the current background image with the new image received from his wife. This change is also detected by the system and is automatically replicated on the Memory Stick®.

Late in the day, the user is told that he may return to his office. He shuts down the notebook computer with the Memory Stick® attached and returns to his office. Once he returns to his office, he connects the Memory Stick® to the personal computer. The computer automatically recognizes that the Memory Stick® belongs to the user by reading an account ID code stored on the Memory Stick®. The system asks the user to log into the system and he complies. Once he has logged into the system, the system automatically transfers the updated large document and the new desktop background to the personal computer.

Figure 2:
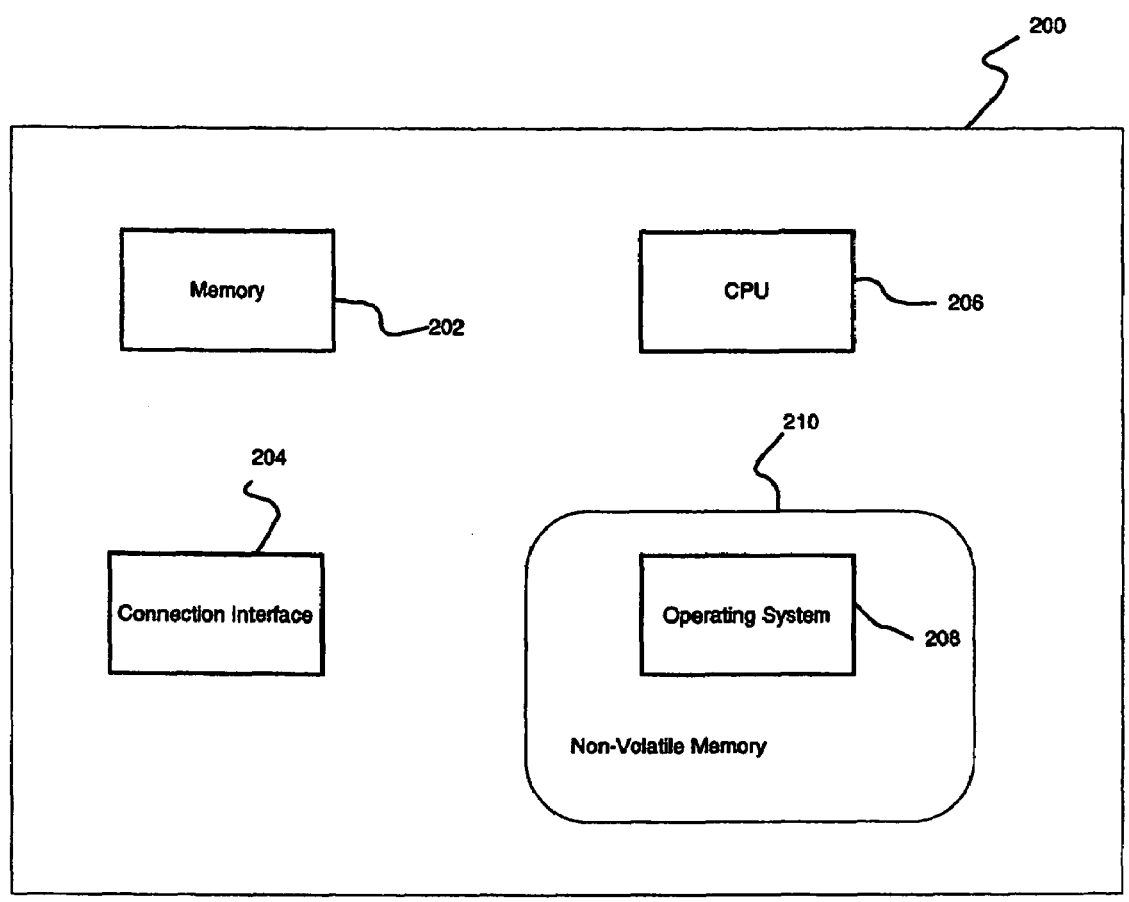
FIG. 2 illustrates an example of a suitable portable storage device on which aspects of the invention may be implemented.

Referring to FIG. 2, a portable storage device 200 that may be used to practice the present invention is shown. A portable storage device (PSD) is any device with storage capability that can share its data with more than one other computing device, for example, computer 110. The PSD 200 has a memory 202. The PSD also may have a connection interface 204 that is used to connect the PSD to some other computing device. Connection interface 204 may be a wired interface that is physically attached to the computer 110 via some input port or connecting wire, or it may be a wireless interface that sends data via radio frequency or infrared signals. Computer 110 may receive input from the PSD via network interface 170, magnetic disk drive 151, or optical disk drive 155, or some other input interface known in the art such as a SCSI port, a parallel port, or any other input interface. The connection provided by connection interface 204 may be a tethered connection that utilizes some physical connection medium such as a wire or input port, or it may be a wireless connection as is well known in the art.

PSD 200 may be a "dumb device" or a "smart device." A dumb device is a device that lacks computational ability. Examples of dumb devices are re-writable compact disks, flash memory storage devices such as Compact Flash, SmartMedia, or Memory Stick®, certain Firewire/1394 devices, USB 1.0 and 2.0 devices and other non-computational storage media as are known in the art. A smart device is a device that has computational ability. Examples of smart devices are handheld computers (e.g. PocketPC or Palm Pilot), mobile telephones, or some other smart portable storage devices as are known in the art. In a smart device, PSD 200 may have a central processing unit (CPU) 206 and/or an operating system (OS) 208 stored on some non-volatile memory 210.

As discussed above, aspects of the present invention may be used to transfer a user profile from one computing device to another computing device. A user profile is a set of files and settings that are associated with a user. The user profile may include data files, application settings, or user environment settings. Data files may include documents, spreadsheets, presentations, databases, pictures, music, videos, or any other file that may be associated with a particular user. Data files may be stored in a specific location on a hard drive (e.g. the "My Documents" virtual folder), or they may be stored on a network share that is accessible by the user, or they may be stored in a combination of locations on the local computer and a network share. Data files may also be grouped logically into various libraries. For example, document files could be placed into a document library, multimedia files such as sound files, picture files, and video files could be placed into a multimedia library.

Application settings may include default saving directories in user applications, default templates, user-created templates, the default homepage in an Internet browser, web browser bookmarks, menu-bar configurations, or any other application specific setting that can be associated with a particular user. These settings may be stored in configuration files (e.g., .ini or .cnf) specific to an application, in an operating system registry, or in some other managed settings environment known in the art.

User environment settings may include a user's desktop configuration, start menu configuration, application toolbar configuration, or some other customization of the operating system shell or namespace.

Figure 3:
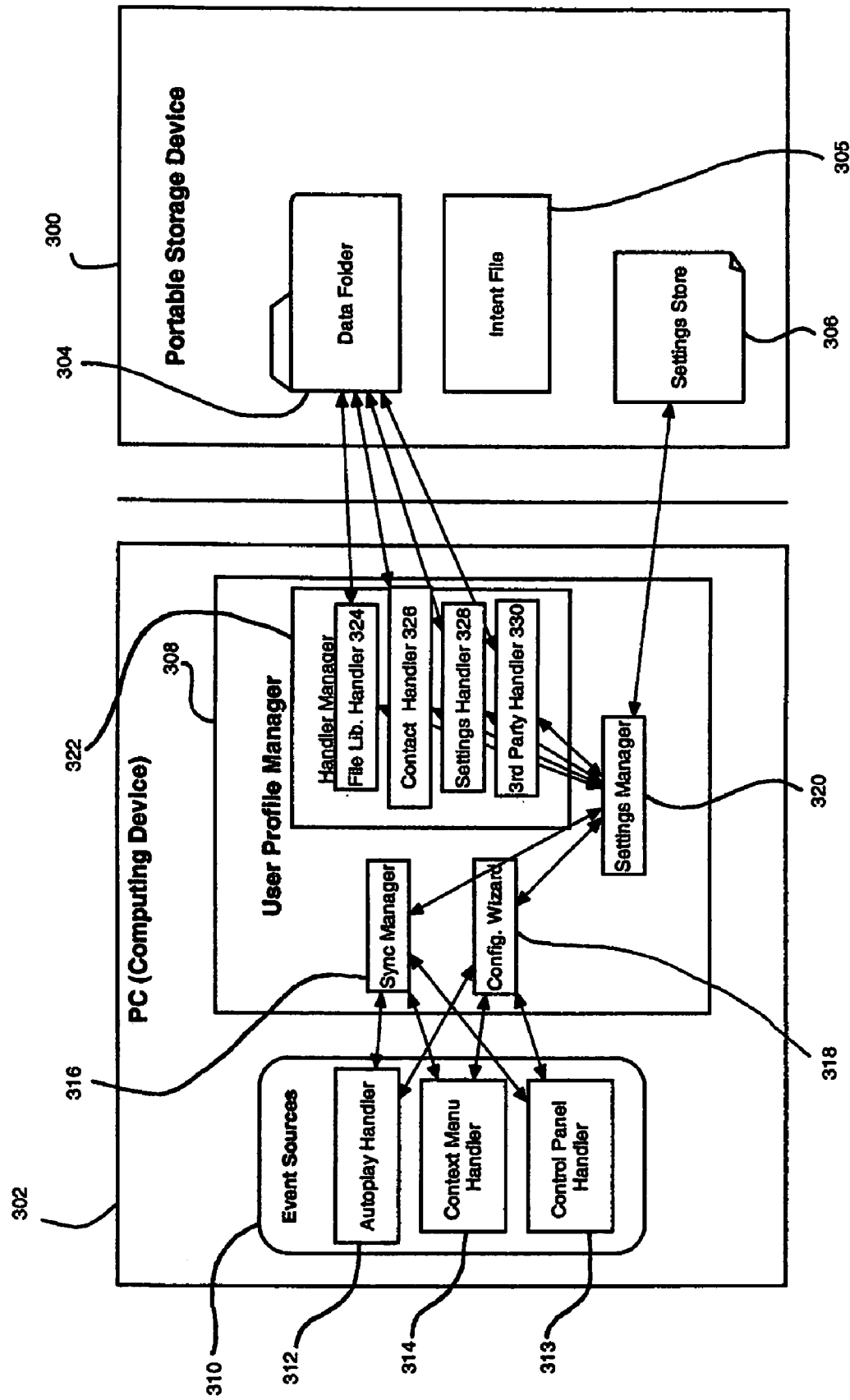
FIG. 3 illustrates a system architecture that may be used to implement aspects of the present invention.

Referring to FIG. 3, a block diagram depicts an illustrative system architecture suitable for practicing an embodiment of the present invention. The diagram shows a PSD 300 (labeled "Portable Storage Device") and a computing device 302 (labeled "PC") separated by a vertical line. Located on the PSD 300 is data folder 304 and settings store 306. Data folder 304 is used to store at least parts of a user profile.

The settings store 306 and data folder 304 hold configuration information for the user profile and possibly user environment or application settings. The configuration information may include current registry settings for the user profile, configuration information for applications that is not stored in a registry (e.g. .ini and .cfg files), machine/user account associations, and a setting that indicates whether file synchronization is enabled for the user profile. This information may be stored in an extensible markup language (XML) file, a combination of several different files, or some other configuration file as known in the art. There is also an autoplay intent file 305 that directs an autoplay feature (discussed below) in the operating system of the computing device to treat the PSD as a user profile. In some embodiments the settings store 306 and data folder 304 will contain synchronized copies of the original profile data which still exist on computing device 302, while in other embodiments the settings store 306 and data folder 304 will contain the only existing copies, thereby guaranteeing that when the device is absent, the data in the settings store 306 and data folder 304 are not accessible.

Computing device 302 may include a user profile manager 308 and a group of user profile event sources 310. User profile event sources may include user actions that generate events (e.g. inserting the PSD into the computing device, or selecting a menu choice), or may also include computer-generated actions that generate events. User profile event sources 310 may generate events that may be handled by three handlers: (1) a user profile autoplay handler 312 that handles autoplay events generated by connecting PSD 300 to computing device 302; (2) a user profile context menu handler 314; and (3) a user profile synchronization control panel handler 313. The user profile context menu handler 314 allows the user to directly control the synchronization process. For example, it may allow the user to select the device from which the system obtains the user profile. The user profile context handler 314 may also allow the user to change synchronization settings and begin the synchronization process. The user profile synchronization control panel handler aggregates synchronization settings and control. For example, a computer may utilize synchronization techniques according to the present invention, while at the same time utilizing techniques from the prior art (such as those described in "Background of the Invention" above). The user profile synchronization control panel handler provides an interface to manage all of the settings for each synchronization technique in a single unified interface.

User profile manager 308 may include two user interfaces: a synchronization manager 316 and a configuration wizard 318. Synchronization manager 316 manages the process of synchronizing the user profile between computing device 302 and PSD 300. The synchronization manager may accomplish its task using file synchronization techniques that are known in the art such as a generic communications application programming interface (API) or the ActiveSync® API. The ActiveSync® API provides for data synchronization between a desktop personal computer and a Windows® CE or Pocket PC device. Configuration wizard 318 (discussed more extensively below) may interact with settings manager 320 to allow the user to specify what items should and should not be included in the user profile.

User profile manager 308 may further include a settings manager 320 and a handler manager 322. Settings manager 320 manages two different types of settings: user profile settings and handler settings. User profile settings define what items should be included in the user profile. For example, a user may wish to include video files in the user profile but not a contacts database. Settings manager 320 works with configuration wizard 318 to create a user profile based on selections made by the user. Handler settings are settings which control behavior of the handlers, including for example a list of things the user selected for synchronization. Handler settings are stored in settings store 306 via settings manager 320.

The handler manager 322 manages the various handlers that are used to synchronize portions of the user profile between computing device 302 and PSD 300. In an illustrative embodiment, the handler manager oversees a File Library Handler 324, a Contact Library Handler 326, a Settings Handler 328, and one or more Hosted Third Party Handlers 330 (a handler not part of the operating system that is provided by an application vendor to synchronize certain settings associated with an application). These various handlers store the personal settings on PSD 300. Personal settings may include application settings or user environment settings that are tied to the operating system (OS) or to some application that runs on top of the OS. Personal settings may also include applications programs. These settings are stored on PSD 300 in data folder 304. Including user environment settings such as desktop background and configuration and start menu configuration in the user profile allows the "look and feel" of the graphical user interface to travel with the user between computing devices. Including application settings in a user profile (e.g. a browser homepage) provides the user with an additional element of consistency across various computing devices.

Referring again to FIG. 3, PSD 300 is shown along with a computing device 302. As used herein, the term computing device refers to any computer that can share data with a PSD. A computing device 302 may take the form of a standard desktop computer, a notebook computer, a handheld computer running an operating system such as PocketPC® (by Microsoft Corporation of Redmond, Wash.), a TabletPC, or any other computer that can share data with a PSD as known in the art.

According to aspects of the present invention, there are two basic connection scenarios between PSD 300 and a computing device such as one of the computing devices 302. The first connection scenario occurs when the PSD 300 is being connected to computing device 302 for the first time (with or without a preexisting user profile). The second scenario occurs when PSD 300 has user profile data stored on it and is being connected to a computing device to which it has been connected before.

In the first connection scenario, PSD 300 may or may not have a detectable user profile stored in its memory. There may be other data stored on the PSD 300 that is not part of any user profile. This extraneous data provides no impediment to practicing the present invention so long as there is sufficient free storage available on PSD 300 for storing user profile data. If there is insufficient free storage available on PSD 300, the system may offer to free up storage space on PSD 300 so that a user profile may be stored in its memory. Alternatively, some or all of the memory on the PSD may be formatted specifically for storing user profile data. For example, a compressed, encrypted disk format for storing user profile data may be used to hold user profile data.

Figure 4:
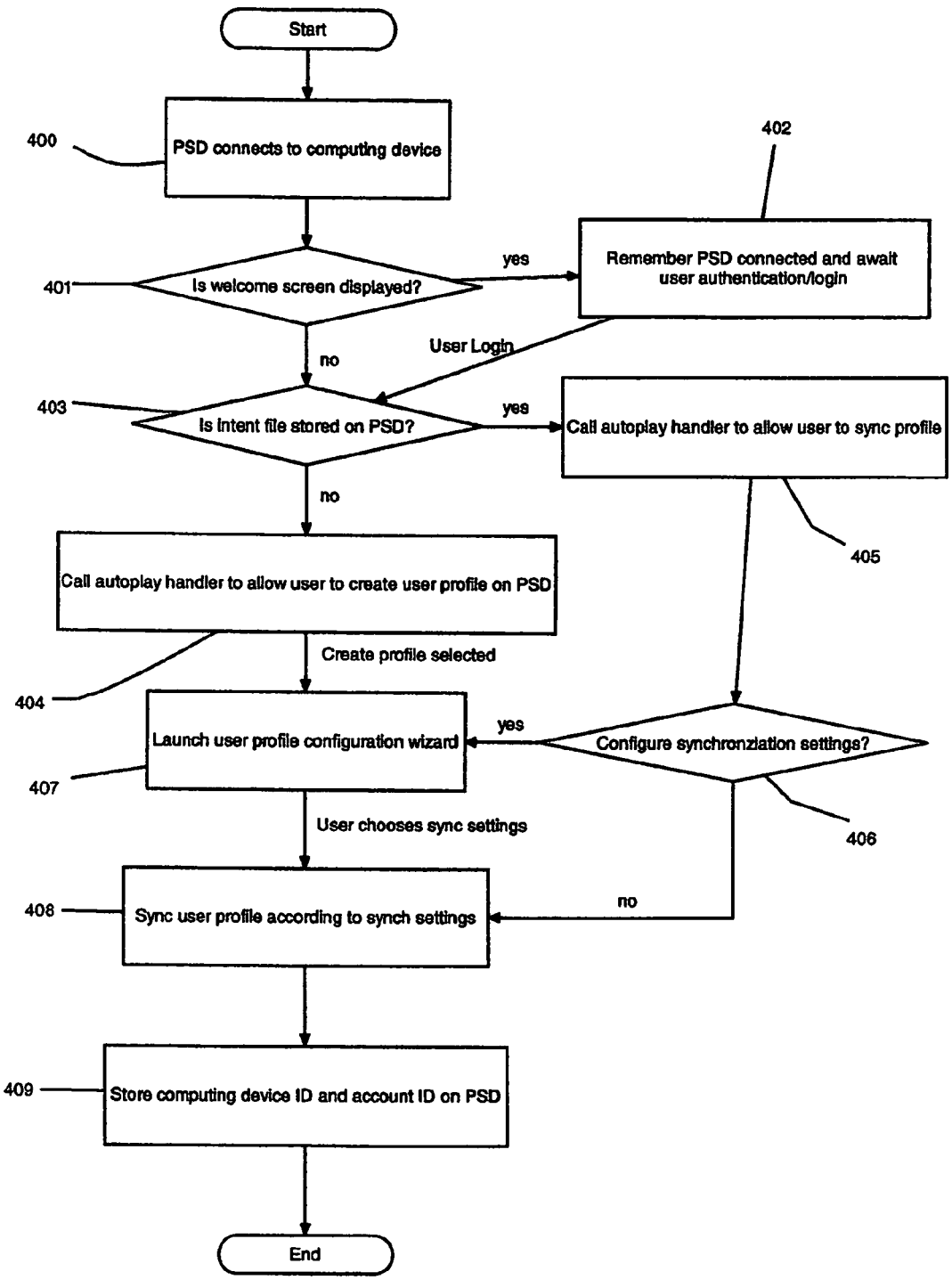
FIG. 4 illustrates a flow chart that describes the steps taken when a portable storage device is first connected to a computing device according to aspects of the present invention.

Referring to FIG. 4, a flowchart is shown describing steps that may be carried out in addressing the first connection scenario. In step 400, the user connects the PSD 300 to first computing device 302. This may involve plugging it into the computing device or a peripheral associated with the computing device, or bringing it near the computing device if it is a wireless connection. In step 401, computing device 302 determines whether a user welcome screen is being displayed on computing device 302 that requires the user to log in to operating system in order to access its functionality. As used herein, the term welcome screen is synonymous with the terms login screen or login prompt as are known in the art. Aspects of the present invention may also be practiced using alternative authentication mechanisms for accessing the computer operating system such as smart cards or biometric authentication, for example. If the welcome screen is not being displayed on computing device 302, indicating that a user is currently logged into the system, the system proceeds to step 403. If the welcome screen is being displayed, computing device 302 remembers that PSD 300 was connected, and waits for a user to log in to the system (step 402). Once the user has logged into the system, it proceeds to step 403. In step 403, computing device 302 scans the PSD 300 to determine whether there is any indication that the PSD 300 already has a user profile stored on it and should be treated as a user profile enabled device. This indication may be embodied in an intent file 305 that is read by a program stored on computing device 302.

The program that reads the intent file 305 may be a program that is automatically called in response to receiving the PSD 300. In one embodiment, the AutoPlay feature is used by the Microsoft® Windows operating system. AutoPlay is a feature that provides a software response to hardware actions initiated by a user on the computing device on which the feature is enabled. For example, when a compact disc containing music files is inserted into the compact disc drive of a computer, the AutoPlay may call an appropriate autoplay handler that launches software to play the music. An intent file is a file that discloses to the system an associated folder that should not be scanned to determine a new software response. The appropriate software response in the associated folder will be based on previously defined AutoPlay settings. If no intent file is located on the PSD, the AutoPlay may be programmed to call some default handler, or it may be programmed to search the contents of the hardware device to determine what kind of files are stored on it.

In an embodiment of the present invention, if there is no intent file on the PSD 300, in step 404 the computing device 302 calls autoplay handler 312 which invokes a routine that allows the user to create a user profile on the PSD 300. The presence of an intent file on PSD 300 indicates that a user profile is already stored on the PSD 300. In this case, rather than calling autoplay handler 312 to create a user profile on PSD 300, computing device 302 calls user profile synchronization control panel handler 316 to allow the user to synchronize the user profile on PSD 300 with the logged in account on computer device 302 as shown in step 405. In an alternative embodiment, the autoplay handler 312 may be preconfigured so that synchronization happens automatically.

In still another embodiment, the user might initiate a scan of the PSD 300 to be carried out by computing device 302, and based on the presence of some specified file or file type, computing device 302 determines whether there is already a user profile stored on the PSD 300 and acts according to the steps discussed immediately above. For example, this scan may be initiated by invoking a synchronization routine from the context menu handler 314. The system looks for an XML settings file stored on PSD 300 in the data folder 304 or possibly in the settings store 306.

If the user chooses to create a user profile on PSD 300 (in the case where no intent file is present on PSD 300), or if the user chooses to configure the synchronization settings of an existing user profile (in step 406) located on PSD 300 (in the case where there is an intent file or some other synchronization setting present), computing device 302 will launch configuration wizard 318 (called out in step 407). If the user chooses not to configure the synchronization settings, step 407 is bypassed and the system proceeds to step 408. After configuration wizard 318 has been called, the user may select synchronization settings (using settings manager 320) from the choices presented by the configuration wizard 318. In step 408, computing device 302 will create or modify (on PSD 300) the user profile based the selections of the user using both settings manager 320 and handler manager 322 (and its subcomponents). In step 409, computing device 302 stores a computing device identifier and a user account identifier to settings store 306 in PSD 300.

Figure 5:
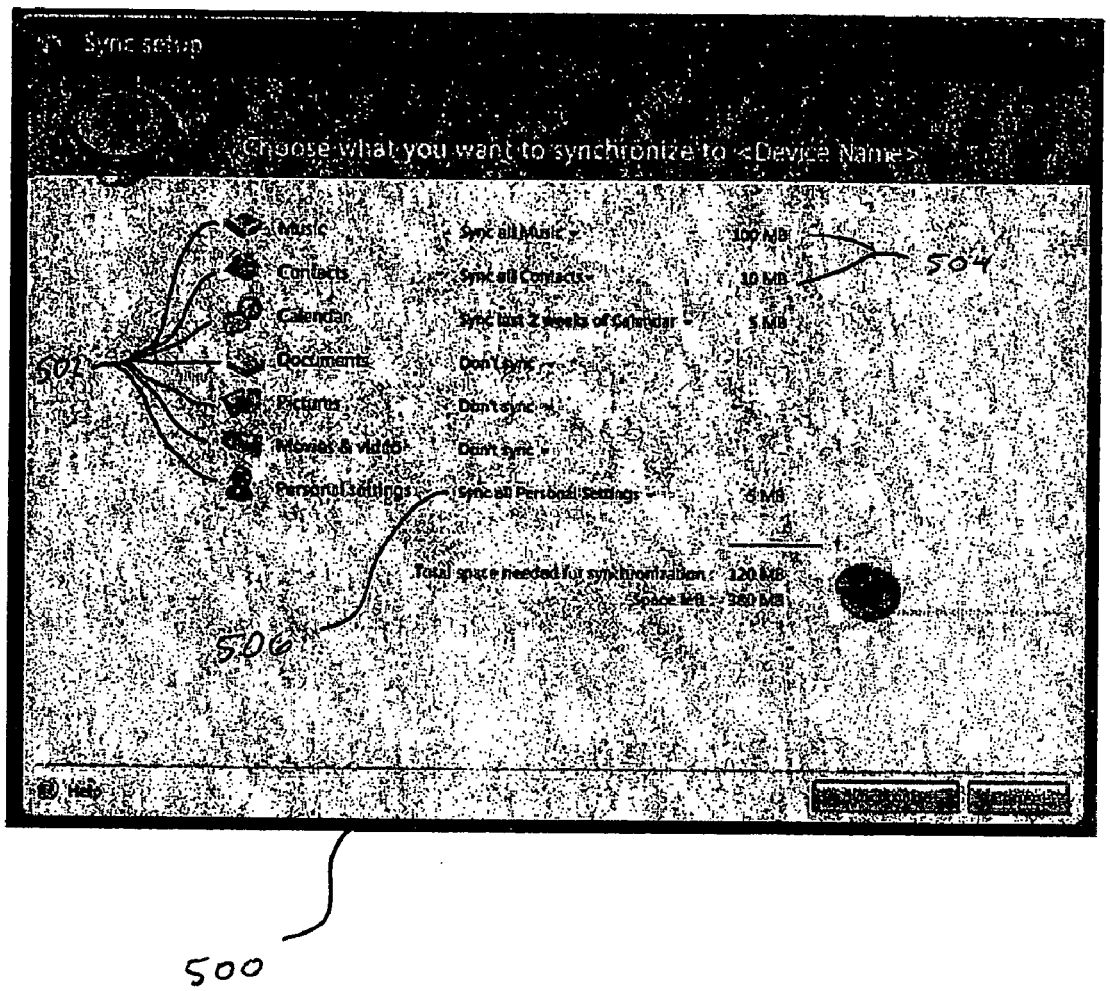
FIG. 5 illustrates a configuration program interface according to aspects of the present invention.

The configuration wizard 318 called in step 406 is presented in more detail in FIG. 5. Upon calling the configuration wizard 318 a program interface 500 may be presented to the user. The program interface 500 may list libraries 502 that are available for storing in a user profile located on PSD 300 (not shown in FIG. 5). Available libraries 502 may be organized by content-type, by file-type, or by some other organizational structure. In the illustrative embodiment shown in FIG. 5, the available libraries 502 are organized by content-type. For each available library 502, additional information may be presented to the user. For example, the system may calculate the amount of storage space 504 required to store the item on PSD 300. More specifically, in one embodiment, it may be determined whether there is sufficient memory available on the PSD to store a user profile. Calculating the amount of storage space required may be useful in cases where the PSD has a limited amount of available storage. The program interface 500 may also present to the user the amount of free space available on PSD 300 so that the user can more easily decide which settings to include in the profile and which settings to leave out.

Figure 6:
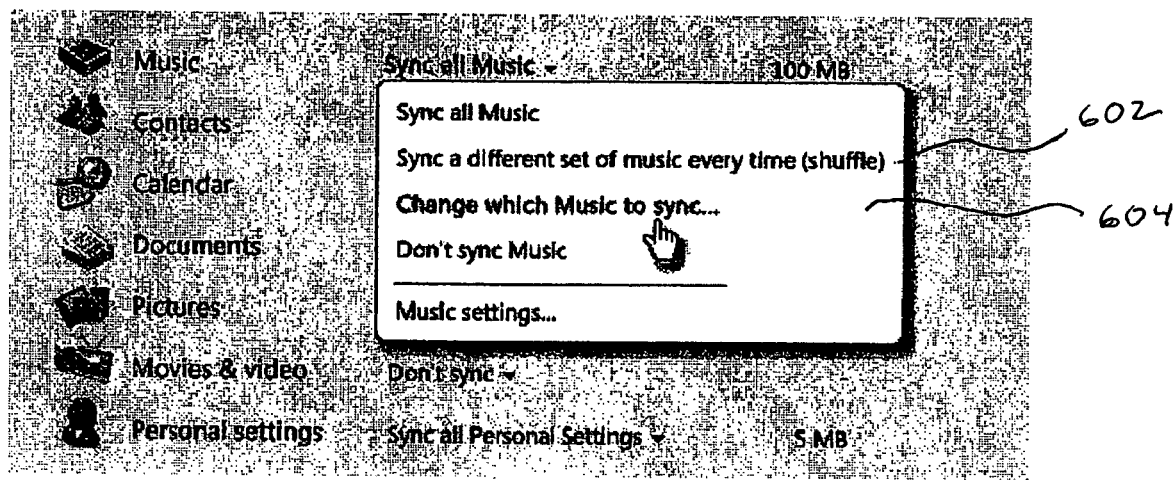
FIG. 6 illustrates an expanded drop-down menu according to aspects of the present invention.

For available library 502, a drop-down menu 506 may be provided to allow the user to control with greater precision how the library 502 is stored in the user profile. Selecting drop-down menu 506 may cause it to expand and display additional selections for the user. Turning briefly to FIG. 6, an expanded drop-down menu 602 is shown for the "Music" item 502. In the expanded drop-down menu 602 are various selections 604 that allow the user to further refine how the items is stored in the user profile. Usually, the default selection will be to "Sync All _____" where _____ is the available library 502. Thus, when the user clicks on the drop-down menu 506 for the available library 502 "Music", a list of selections including (but not necessarily limited to) "Sync all Music," "Sync a different set of music every time (shuffle)," "Change Which Music to synch . . ." and "Don't Sync Music" may be available for selection.

Figure 7:
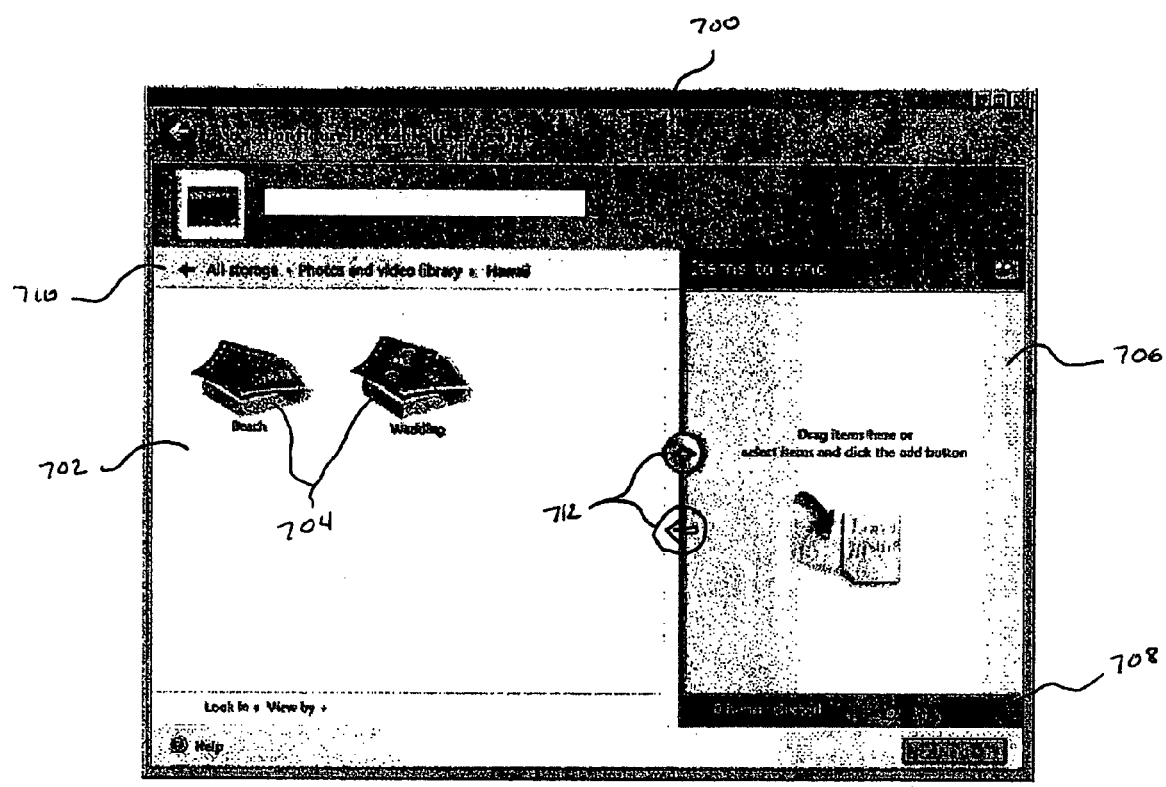
FIG. 7 illustrates a drill-down user interface according to aspects of the present invention.

If the user chooses one of the selections (other than "Sync All") available in the expanded drop-down menu 602, a drill down user interface 700 (DDUI) may be presented as shown in FIG. 7. The DDUI 700 may include a listview 702 that presents the content items 704 in the library 502 that are available for syncing. The DDUI 700 may also include a basket control 706 that shows the items that have been chosen to be stored on PSD 300. The basket control 706 may include a space used status bar 708 that indicates how much storage space the items in the basket will require. The DDUI 700 may further include two toolbars: A "breadcrumb" bar 710 as is known in the art to allow the user to easily navigate to preceding page views (by providing a trail of "breadcrumb" pages), and a set of operational buttons 712 for the basket control 706. These operational buttons may include an "Add to Basket" button (indicated by an arrow pointing into the basket with a plus sign) and a "Remove from Basket" button (indicated by an arrow pointing away from the basket with a minus sign). When a user selects content item 704 from the listview 702 and clicks on the "Add to Basket" button, the content selected is placed in the basket control 706 and will be synced to PSD 300 when synchronization occurs. In addition to the "Add to Basket" operational button 712, a context menu (i.e. a menu that appears when a user right-clicks on content item 704) may be provided that includes an "Add to Basket" and a "Remove from Basket" selection.

The content items 704 that are placed in the listview 702 may be files, folders, libraries, stacks, containers or any other file organizational entity as known in the art. If a content item contains sub-items (e.g. folder includes files, container including sub-container), the user can navigate to the sub-items by double clicking on the content item. A user can add entire folders to the basket control 706 or individual files. If a content item 704 in the listview 702 has been added to the basket control 706, it may have an icon overlay to express that the content item 704 is already in the basket control 706. This will allow the user to avoid attempting to add content items to the basket control 706 that are already included. The system may be configured to disallow duplicate copies of a content item 704 in basket control 706. For example, if a user places a content item 704 in the basket control 706 and then tries to place the content item 704 in the basket again, the system may present a dialogue box that provides a message that indicates that the file or folder (i.e. content item 704) is already in the basket. In another aspect of the present invention, the user may select multiple content items 704 and attempt to place them in the basket control 706. If none of the content items 704 are present in the basket 706, then the operation will succeed. If, however, some of the content items 704 are already included in the basket control 706, then a dialogue box may appear with a message indicating that the already included content items will not be placed in the basket control, but that the new items will be added. In another embodiment, content items 704 that already exist in the basket may be simply be skipped without notifying the user while new items are added to the basket.

This discussion immediately above was directed to the configuration of synchronization settings for files and folders. For determining which application settings and user environment settings to include in the user profile, the configuration page may be slightly different. Referring to FIG. 8, a chart is shown that lists the available selections in an expanded drop-down menu for configuring the synchronization of user environment settings and/or application settings. Selectively choosing settings to sync will result in DDUI similar but not identical to the DDUI used for syncing files and folders described above. In the case of settings, the DDUI lists out all of the settings for applications that are customizable and can be transferred using a user profile. The user is then able to select via checkbox, which settings to include in the user profile.

Finally, at the end of the configuration wizard, the user is presented an option to synchronize the selected user profile onto the PSD. Upon making the selection, all of the data in the user profile is immediately copied from computing device 302 to PSD 300. In one illustrative embodiment, the synchronization manager 316 continues to monitor the user profile data on computing device 302. Anytime a change is made to the user profile data, that change is automatically replicated on the user profile stored on PSD 300 without any user interaction.

In yet another aspect of the present invention, a PSD 300 with an existing user profile may be plugged into a computing device for the first time. Referring to FIG. 9, a flow chart is shown that describes how this situation may be handled in accordance with aspects of the present invention.

In step 900, the PSD is connected to the computing device for the first time. The system then checks to see if the computing device is at a welcome (e.g. login) screen. If the welcome screen is displayed, the system may remember that a PSD has been connected and await log in by the user (called out in 902). If the welcome screen is not initially displayed, or the user has logged into the computing device, the system proceeds to step 903, where an autoplay dialogue is launched (after checking whether there is a PUP already present on the computing device) that includes an option to synchronize the user profile. If the user elects to synchronize the user profile with the computing device, in step 904 the synchronization manager 316 begins the syncing process. Next, in step 905, the computing device ID and an account ID representing the logged in user account are stored on the PSD so that the next time the PSD is connected to the machine, handler manager 322 can recognize the previous association.

Figure 10:
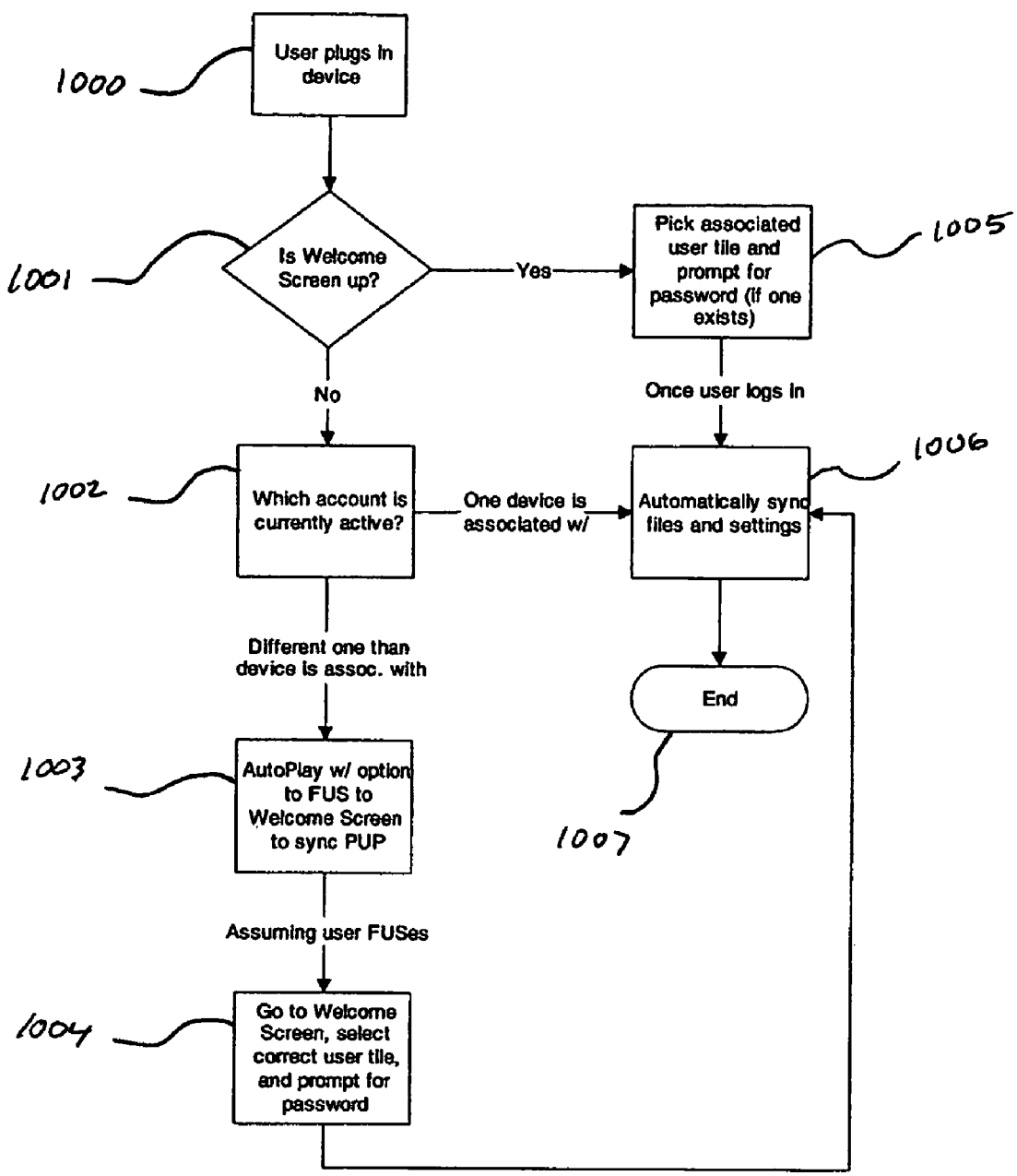
FIG. 10 illustrates a flow chart that describes steps taken when a portable storage device with an existing user profile is connected for a second time to a computing device according to aspects of the present invention.

When PSD 300 is connected to computing device 302 for the second time (assuming a user profile was configured), the autoplay handler 312 may receive the device arrival event and launch the synchronization process without prompting the user. Referring to FIG. 10, in step 1000 the PSD is connected to the computing device. In step 1001, the system determines whether the welcome (i.e. login) screen is being displayed by the computing device. If the welcome screen is being displayed, the autoplay handler will, in step 1005, select the user account associated with the PSD user profile, and prompt the user to enter a password to log into the account. Assuming the correct password is entered, the system will proceed to step 1006 (discussed below). If the welcome screen is not up, the system proceeds to step 1002 and determines which account is currently active. If the currently active account is associated with the PSD, the system proceeds to step 1006 and automatically synchronizes the user profile with the computing device. If the logged in account is different than the account with which the PSD is associated, in step 1003 the autoplay handler 316 will provide a menu with an option to Fast User Switch to the welcome screen so that the user may synchronize the PSD with his account. When the user elects the Fast User Switch option, in step 1004 the system presents a new welcome screen with the user's account highlighted and prompts for a password. Once the correct user logs into the computing device, the system will proceed to step 1006, where the user profile is automatically synched without interaction from the user.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for creating a user profile comprising the steps of:
    detecting a connection of a Portable Storage Device (PSD) to a computing device;
    upon detecting the connection of the PSD, scanning the PSD for an indication of a stored user profile containing data files, application settings and user environment settings, wherein the user environment settings include one or more of a user's desktop configuration, a start menu configuration, or an application toolbar configuration;
    upon detecting that no user profile is stored on the PSD:
        automatically launching a user profile configuration wizard that enables the user to create a user profile on the PSD,
        receiving input from the user profile configuration wizard, wherein the input includes an instruction to synchronize a first data content item and an instruction to not synchronize a second data content item that is different from the first data content item, and
        upon receiving the input from the user profile configuration wizard, automatically storing the first data content item on the PSD in association with a new user profile;
    determining that the first data content item has been modified;
    based on the new user profile, automatically synchronizing the modified first data content item with the PSD;
    determining that the second data content item has been modified;
    based on the new user profile, not synchronizing the modified second data content item with the PSD;
    determining that one or more of the user environment settings associated with the new user profile has been modified; and
    based on the new user profile, automatically synchronizing the user environment setting with the PSD.

2. The method according to claim 1, wherein the data content items comprise a plurality of different types of data.

3. The method according to claim 2, wherein the plurality of different types of data include one or more contacts, multimedia files, calendar data, and documents.

4. The method according to claim 2, wherein for each of the plurality of types of data, the user may select all, some, or none of the data.

5. The method according to claim 4, further comprising the step of synchronizing the selected data with data on a later-connected PSD.

6. The method according to claim 2, wherein the plurality of different types of data comprises user settings.

7. The method according to claim 6, further comprising the step of prompting the user to select for synchronization all, some, or none of the user settings.

8. The method according to claim 7, further comprising the step of displaying, if the user chooses some of the user settings for synchronization, a list of user settings to the user.

9. The method according to claim 8, wherein each item in the list of user settings is accompanied by a checkbox that, if checked, selects the item for synchronization.

10. The method according to claim 1 further comprising determining whether there is sufficient memory available on the PSD to store a user profile.

11. The method according to claim 10, wherein if there is sufficient memory available on the PSD to store a user profile, selecting a portion of memory on the PSD for storing the user profile and formatting the portion of memory for use as a user profile.

12. A computer readable storage medium on which is stored computer executable instructions that cause a computer to perform a method for creating a user profile comprising the steps of:
   detecting a connection of a Portable Storage Device (PSD) to a computing device;
   upon detecting the connection of the PSD, scanning the PSD for an indication of a stored user profile containing data files, application settings and user environment settings that are used to configure the computing device;
   upon detecting that no user profile is stored on the PSD:
      automatically launching a user profile configuration wizard,
      receiving input from the user profile configuration wizard, wherein the input includes an instruction to synchronize a first data content item and an instruction to not synchronize a second data content item that is different from the first data content item, and
      upon receiving the input from the user profile configuration wizard, automatically storing the first data content item on the PSD in association with a new user profile;
   determining that the first data content item has been modified;
   based on the new user profile, automatically synchronizing the modified first data content item with the PSD;
   determining that the second data content item has been modified; and
   based on the new user profile, not synchronizing the modified second data content item with the PSD.

13. The computer readable medium of claim 12, wherein the user profile configuration wizard allows a user to select data content items available to the user profile for synchronization.

14. The computer readable medium of claim 13, wherein the data content items comprise a plurality of different types of data.

15. The computer readable medium of claim 14, wherein the plurality of different types of data include one or more contacts, multimedia files, calendar data, and documents.

16. The computer readable medium of claim 15, wherein for each of the plurality of types of data, the user may select all, some, or none of the data.

17. The computer readable medium of claim 16, further comprising the step of synchronizing the selected data with data on a later-connected PSD.

18. The computer readable medium of claim 13, wherein the data content items comprise user settings.

19. The computer readable medium of claim 18, further comprising the step of prompting the user to select for synchronization all, some, or none of the user settings.

20. The computer readable medium of claim 19, further comprising the step of upon the user choosing some of the user settings for synchronization, a list of user settings being displayed to the user.

21. The computer readable medium of claim 20, wherein each item in the list of user settings is accompanied by a checkbox that, if checked, selects the item for synchronization.

22. The computer readable medium of claim 12, wherein the method performed by the computer further comprises determining whether there is sufficient memory available on the PSD to store a user profile.

23. The computer readable medium of claim 22, wherein if there is not sufficient memory available on the PSD to store a user profile, offering to free up storage space on the PSD by deleting files stored on the PSD.

24. A computer comprising a processor and a memory including computer executable instructions that cause the computer to perform a method for creating a user profile comprising the steps of:
   detecting a connection of a Portable Storage Device (PSD) to a computing device;
   upon detecting the connection of the PSD, scanning the PSD for an indication of a stored user profile containing data files, application settings and user environment settings that are used to configure the computing device;
   upon detecting that no user profile is stored on the PSD:
      automatically launching a user profile configuration wizard,
      receiving input from the user profile configuration wizard, wherein the input includes an instruction to synchronize a first data content item and an instruction to not synchronize a second data content item that is different from the first data content item, and
      upon receiving the input from the user profile configuration wizard, automatically storing the first data content item on the PSD in association with a new user profile;
   determining that the first data content item has been modified;
   based on the new user profile, automatically synchronizing the modified first data content item with the PSD;
   determining that the second data content item has been modified; and
   based on the new user profile, not synchronizing the modified second data content item with the PSD.

25. The computer of claim 24, wherein the user profile configuration wizard allows a user to select for synchronization data content items available to the user profile.

26. The computer of claim 25, wherein the data content items comprises a plurality of different types of data.

27. The computer of claim 26, wherein the plurality of different types of data include one or more contacts, multimedia files, calendar data, and documents.

28. The computer of claim 26, wherein for each of the plurality of types of data, the user may select all, some, or none of the data.

29. The computer of claim 28, further comprising the step of synchronizing the selected data with data on a later-connected PSD.

30. The computer of claim 25, wherein the data content items comprise user settings.

31. The computer of claim 30, further comprising the step of prompting the user to select for synchronization all, some, or none of the user settings.

32. The computer of claim 31, further comprising the step of upon the user choosing some of the user settings for synchronization, a list of user settings being displayed to the user.

33. The computer of claim 32, wherein each item in the list of user settings is accompanied by a checkbox that, if checked, selects the item for synchronization.

34. The computer of claim 24, wherein the method performed by the computer further comprises determining whether there is sufficient memory available on the PSD to store a user profile.

35. The computer of claim 34, wherein if there is not sufficient memory available on the PSD to store a user profile, offering to free up storage space on the PSD by deleting files stored on the PSD.

* * * * *

UNITED STATES PATENT AND TRADEMARK OFFICE
CERTIFICATE OF CORRECTION

PATENT NO.       : 7,620,667 B2                                        Page 1 of 1
APPLICATION NO. : 10/713429
DATED            : November 17, 2009
INVENTOR(S)      : Rollin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Fourteenth Day of December, 2010

David J. Kappos
*Director of the United States Patent and Trademark Office*